United States Patent [19]
Makhlouf et al.

[11] Patent Number: 5,712,317
[45] Date of Patent: Jan. 27, 1998

[54] CURABLE, SPRAYABLE COMPOSITIONS FOR REINFORCING THIN RIGID PLATES

[75] Inventors: Joseph M. Makhlouf, Mars; John R. Schneider, Glenshaw, both of Pa.

[73] Assignee: PPG Industries, Inc., Pittsburgh, Pa.

[21] Appl. No.: 475,475

[22] Filed: Jun. 7, 1995

Related U.S. Application Data

[63] Continuation-in-part of Ser. No. 220,656, Mar. 31, 1994.
[51] Int. Cl.$^6$ .................................. C08J 9/24; C08J 9/32
[52] U.S. Cl. ........................ 521/76; 521/54; 521/59; 521/135
[58] Field of Search ................... 521/54, 59, 135, 521/78

[56] References Cited

U.S. PATENT DOCUMENTS

| | | | |
|---|---|---|---|
| 3,960,785 | 6/1976 | Babcock | 523/218 |
| 4,005,033 | 1/1977 | Georgeau et al. | 260/2.5 B |
| 4,077,921 | 3/1978 | Sharpe et al. | 260/2.5 B |
| 4,528,305 | 7/1985 | Henry | 523/219 |
| 4,739,019 | 4/1988 | Schappert et al. | 525/438 |
| 4,751,129 | 6/1988 | Ramalingam et al. | 428/195 |
| 4,923,902 | 5/1990 | Wyceh | 521/54 |
| 4,995,545 | 2/1991 | Wycech | 264/36 |
| 5,009,810 | 4/1991 | Wason et al. | 521/59 |
| 5,151,327 | 9/1992 | Nishiyama et al. | 428/343 |
| 5,155,138 | 10/1992 | Lundqvist | 521/76 |

FOREIGN PATENT DOCUMENTS

| | | |
|---|---|---|
| MI 93 A 000636 | 9/1994 | Italy. |
| 1115247 | 5/1968 | United Kingdom. |
| WO 89/08678 | 9/1989 | WIPO. |

OTHER PUBLICATIONS

Cotton et al., Advanced Inorganic Chemistry, A Comprehensive Text, 4th ed., 1980, pp. 300–301.
Hawley, G., ed. "The Condensed Chemical Dictionary", 8th ed., 1971, p. 289.
Nobel Industries Sweden, Technical Bulletin No. 21, Sep. 1989.
Abstract of 4241931, Japanese patent document dated Aug. 1992.
Lee et al., "Handbook of Epoxy Resins", McGraw Hill, New York, 1982, pp. 5/14–5/15 and 14/4.

Primary Examiner—Morton Foelak
Attorney, Agent, or Firm—Krisanne Shideler; Kenneth J. Stachel

[57] ABSTRACT

The present invention provides a method of reinforcing thin rigid plates. The method comprises applying, preferably by spray application, a curable composition onto one side of the rigid plate followed by curing the composition while only in contact with the rigid plate. The curable composition comprises: (i) a thermosetting resinous composition and (ii) expandable microspheres. The composition may optionally contain a particulate reinforcing material selected from the group consisting of milled glass fibers, milled carbon fibers, and mixtures thereof.

18 Claims, No Drawings

CURABLE, SPRAYABLE COMPOSITIONS FOR REINFORCING THIN RIGID PLATES

This application is a continuation-in-part of copending U.S. patent application Ser. No. 08/220,656, filed on Mar. 31, 1994.

FIELD OF THE INVENTION

The present invention relates to the use of curable compositions in a process for reinforcing thin rigid plates or sheets, and to the reinforced plate or sheet itself.

BACKGROUND OF THE INVENTION

The use of thin gauge rigid plates or sheets in automobile manufacture has been greatly accelerated due to improved corrosion protection, lighter weight, easy formability and lower cost. This practice has left certain parts of a car more vulnerable to easy denting and damage. Historically, either a reinforcing plate is welded or bonded to these areas, or a precut patch of epoxy impregnated glass fibers is attached.

Reinforcing compositions prepared from thermosetting resins, particularly epoxy resins, used to reinforce thin rigid sheets used in automobiles exhibit a number of advantages including strength, adhesion, and corrosion resistance. One distinct disadvantage is that many thermosetting resins, particularly epoxy based compositions, deform the substrates to which they bond due to shrinkage during curing.

In the automobile industry this deformation is of particular concern where the appearance of the substrate is critical. This substrate deformation necessitates additional costs in labor and materials in order to restore the intended appearance of the substrate.

U.S. Pat. No. 5,151,327 discloses an adhesive sheet for reinforcing thin rigid plates. Such adhesive sheets comprise several resinous layers and need to undergo a sizing treatment before application to the thin rigid plates. The adhesive sheets contain foaming agents to prevent shrinkage during cure. Application is by lamination.

U.S. Pat. No. 4,739,019 discloses an adhesive composition for use in automotive applications. This composition contains an epoxide and a thermoplastic polyester. Such a composition loses its strength when heated to curing temperatures because the viscosity of the thermoplastic polyester decreases, and when applied to the underside of a substrate, the composition tends to sag or fall off the substrate during heating.

U.S. Pat. No. 5,155,138 discloses the use of expandable thermoplastic microspheres in polymers and paints. It is also known to use expandable microspheres in car underbody coatings and sealants. (See Nobel Industries Technical Bulletin no. 21). There is no teaching of the use of such microspheres in thin panel reinforcing compositions.

It is desirable to develop a curable thermosetting composition, preferably sprayable for convenient application, which when used to reinforce thin rigid plates used in automobile manufacture exhibits excellent physical properties and reduced shrinkage.

SUMMARY OF THE INVENTION

In accordance with the present invention there is provided a method of reinforcing thin rigid plates. The method comprises applying a curable composition onto one side of the rigid plate followed by curing the composition while only in contact with the rigid plate. The curable composition comprises: (i) a thermosetting resinous composition and (ii) expandable microspheres. The composition may optionally contain a particulate reinforcing material selected from the group consisting of milled glass fibers, milled carbon fibers, and mixtures thereof.

The present invention also provides the reinforced rigid plate itself prepared by the method described above.

DETAILED DESCRIPTION

Examples of suitable thermosetting resins used in the composition of the present invention include various kinds known to those skilled in the art, such as epoxy resins, including glycidyl ethers, glycidyl esters, glycidyl amines, linear-aliphatic epoxides and alicyclic epoxides, and modified epoxy resins derived therefrom.

The preferred epoxy-based materials in the composition of the present invention contain at least two 1,2-epoxide groups per molecule. These materials are also referred to as polyepoxides. In general, the epoxy equivalent weight can range from about 140 to about 750. These polyepoxides may be saturated or unsaturated, cyclic or acyclic, aliphatic, alicyclic, aromatic, or heterocyclic. They may contain substituents such as halogens, hydroxyl groups, and ether groups.

Suitable classes of polyepoxides include epoxy ethers obtained by reacting an epihalohydrin such as epichlorohydrin with a polyphenol in the presence of an alkali. Suitable polyphenols include resorcinol, catechol, hydroquinone, bis(4-hydroxyphenyl)-2,2-propane (i.e., Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. The polyglycidyl ether, particularly the diglycidyl ether, of Bisphenol A is preferred.

Other suitable polyepoxides include polyglycidyl ethers of polyhydric alcohols. These compounds may be derived from polyhydric alcohols such as ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols such as polypropylene glycol and hydroxyl functional polyesters.

Examples of other suitable polyepoxides include polyglycidyl esters of polycarboxylic acids. These compounds may be formed by reacting epichlorohydrin or another epoxy material with an aliphatic or aromatic polycarboxylic acid such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) may also be used in the formation of these polyglycidyl esters of polycarboxylic acids.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

The polyepoxides can be partially defunctionalized by carboxylic acids, alcohol, water, phenols, mercaptans, or other active hydrogen-containing compounds to yield hydroxyl-containing polyepoxides if desired. Preferred are epoxy-terminated adducts of dimer fatty acids and epoxy-terminated adducts of polyesters containing sebacic, azelaic, and/or dodecanedioic acids.

Although the curable composition usually comprises a mixture of two or more epoxide group-containing materials selected from the group consisting of diglycidyl ether of Bisphenol A, diglycidyl ether of polypropylene glycol, and glycidyl ether-terminated adducts of diepoxides and diacid-containing moieties, monoepoxides can be used to modify the viscosity of the composition and modulate the rate of cure. Suitable monoepoxides include alkyl and aryl glycidyl ethers. The alkyl groups in the alkyl glycidyl ethers may be linear or branched alkyl, substituted or unsubstituted, saturated or unsaturated. Examples of suitable alkyl groups include groups having from 4 to 18 carbon atoms such as butyl, octyl, decyl, dodecyl, and the like. Suitable substituents include alkyl, aryl, and alkoxy. The alkyl group may also be substituted or unsubstituted aryl. Suitable substituents include alkyl or alkoxy having 1 to 10 carbon atoms, and aryl. Oil-derived monoepoxides such as CARDOLITE NC-513, a cashew oil-derived monoepoxide available from Cardolite Corporation, are also suitable. Other similar monoepoxides known to those skilled in the art may also be used.

Typically, the curable composition of the present invention contains from about 40 to about 80 percent of the thermosetting resinous composition, preferably from about 55 to 80 percent, based upon total weight of the composition.

The expandable microspheres in the composition of the present invention may be any thermoexpandable hollow or solid microsphere or microbead as known to those skilled in the art. Such expandable microspheres are distinguishable from conventional blowing and foaming agents in that the microspheres are typically discrete, inert particles within the composition that expand but do not evaporate or dissipate upon heating as would a blowing or foaming agent, which is generally a liquid that expands as a gas upon heating, causing expansion of the resinous matrix or medium in which it is impregnated. The expandable microspheres usually comprise a thermoplastic polymeric shell containing a volatile liquid propellant. Upon heating to a temperature above the softening point of the polymer and the boiling point of the propellants the spheres expand to as much as five times their original diameter. The polymeric shell may be a polymer or copolymer of, for example, vinyl chloride, vinylidene chloride, acrylonitrile, methyl methacrylate, styrene, or mixtures thereof. Suitable propellants include freons, such as trichlorofluoromethane, hydrocarbons, such as n-pentane, isopentane, neopentane, butane, isobutane, or other conventional propellants.

The expandable microspheres prevent shrinkage of the composition during cure, allowing the substrate to which the composition is applied to retain its surface shape and appearance. When the curable composition is applied to the under surface of a substrate and cured, the expandable microspheres are advantageous in that they do not cause the composition to fall or blow off the substrate, unlike foaming agents. The foaming action of foaming agents is often forceful enough to blow a reinforcing composition off the underside of a substrate during cure.

Expandable microspheres such as those described in U.S. Pat. Nos. 4,005,033 and 5,155,138, hereby incorporated by reference, are suitable for use in the method of the present invention. Particularly preferred expandable microspheres are available from Casco Nobel AB under the name EXPANCEL.

The expandable microspheres are present in an amount based on percent by weight of the total weight of the composition ranging from 1 to 7 percent and preferably 2 to 5 percent, and most preferably 3 to 5 percent by weight, based upon total weight of the composition.

The composition used in the process of the present invention may optionally contain a particulate reinforcing agent, such as milled glass fibers, milled carbon fibers, or mixtures thereof. The milled fibers used in the method of the present invention are preferably about 1/16 inch (1.59 mm) or less in length. Milled fibers, such as defined in *The Manufacturing Technology of Continuous Glass Fibres* by K. L Lowenstein, incorporated herein by reference, generally have lengths up to about 1.5 mm and are also suitable for use in the present invention. The reinforcing agent, when used, is generally present in an amount up to about 40 percent by weight, preferably ranging from about 8 to 40 percent by weight, and more preferably about 15 to 30 percent by weight, based upon total weight of the composition. When the reinforcing agent is present in the composition, the thermosetting resinous composition is present in an amount ranging from about 40 to 80 percent by weight, based upon total weight of the composition, and the expandable microspheres are present in an amount ranging from about 1 to 7 percent by weight, based upon total weight of the composition.

The composition used in the method of the present invention may also contain a latent crosslinking agent such as boron trifluoride monoethylamine complex, boron trifluoride diethylamine complex, boron trifluoride triethylamine complex, boron trifluoride pyridine complex, boron trifluoride benzyldimethylamine complex, boron trifluoride benzylamine, and boron trifluoride etherate. By latent is meant that these materials are inactive until the application of heat. Mixtures of crosslinking agents may also be used.

The crosslinking agent is typically present in an amount ranging from about 1 to about 13 percent by weight, preferably from about 3 to about 8 percent by weight, based upon total weight of the curable composition.

The curable composition used in the method of the present invention may also contain one or more catalysts that are capable of initiating epoxy cure at moderate temperatures. Typically, these are dihydrazides of dibasic acids such as adipic and sebacic acids. Sebacic dihydrazide is the preferred catalyst. Other suitable catalysts include dicyandiamide and the reaction product of (i) an organic polyisocyanate, preferably a diisocyanate, with a diamine containing a primary or secondary amine group and a tertiary amine group, and (ii) an acid functional compound, preferably a polyphenol. The equivalent ratio of polyisocyanate to diamine to acid functional compound is generally about 1:1:3 to 1:1:4. The adduct of isophorone diisocyanate and dimethylaminopropyl amine and Bisphenol A is preferred.

The catalysts, when present, are typically present in an amount ranging from about 0.5 to about 5 percent by weight, preferably from about 0.5 to about 2.5 percent by weight, based upon total weight of the curable composition.

The curable composition may also contain a variety of optional additives including pigments such as carbon black, fillers such as calcium oxide, aluminum powder, and wollastonite, and thixotropes such as bentonite clay. The composition may be prepared as a one-package composition.

The optional additives, when present, are typically present in an amount ranging from about 5 to about 30 percent by weight, preferably from about 10 to about 20 percent by weight, based upon total weight of the curable composition.

Generally, the amounts of the components including any particular optional components that may be used in the composition can be chosen from the aforespecified ranges of percentages by weight of the total composition where the percentages when added together equal 100 percent.

The substrates to which the curable compositions of the present invention are generally applied may be thin rigid sheets or plates such as thin metal plates including steel plates, aluminum plates, copper plates, and stainless steel plates, and thin plastic plates such as fiberglass reinforced polyester plates, and other plastic plates. Steel plates are preferred. The thin metal rigid plates or sheets generally have a thickness of about 0.3 to 2 mm.

The curable composition of the present invention may be applied to the substrate in a number of ways including spraying, extrusion, or by hand with a blade. Spraying is the preferred method of application because of ease of application and consistent thickness of the applied layer. The applied layer generally has a thickness of about 40 to 240 mils (1 to 6 mm) before curing and 80 to 360 mils (2 to 9 mm) after curing.

The composition is typically cured by heating to a temperature of about 300° F. to about 375° F., preferably about 325° F. for a period ranging from about 20 minutes to 1 hour.

The curable composition is used in a method for reinforcing thin rigid plates or sheets, comprising applying the composition to the thin rigid plate or sheet as described above and curing the composition while it is in contact with only the rigid plate or sheet. When used to reinforce a thin rigid plate or sheet, the composition is applied to one side of the plate or sheet and is adhered to no other surface; that is, it is not serving as an adhesive composition. In hemmed fixtures, upon expansion during cure the composition may touch and adhere to another surface. This is incidental, however.

The invention will further be described by reference to the following examples. Unless otherwise indicated, all parts are by weight.

The following examples (1 to 4) illustrate the effect of fiber reinforcement and expandable microspheres on flexural strength and readthrough. The composition of Example 1 contains milled glass fibers. The composition of Example 2 contains milled carbon fibers. A mixture of glass and carbon fibers is used in Example 3, and Example 4 is a comparative example, wherein the composition contains a mixture of carbon and glass fibers but no expandable microspheres.

Reinforcing compositions were prepared from the following mixture of ingredients:

| Ingredient: | Example: | | | |
|---|---|---|---|---|
| | 1 | 2 | 3 | 4 |
| EPON 828[1] | 39.4 | 39.4 | 39.4 | 39.4 |
| Epoxy ester[2] | 8.12 | 8.12 | 8.12 | 8.12 |
| EPON Dimer acid[3] | 4.06 | 4.06 | 4.06 | 4.06 |
| CARDOLITE NC-513[4] | 4.06 | 4.06 | 4.06 | 4.06 |
| BENTONE 27[5] | 4.87 | 4.87 | 4.87 | 4.87 |
| CABOSIL TS-720[6] | 0.61 | 0.61 | 0.61 | 0.61 |
| Dicyandiamide | 3.05 | 3.05 | 3.05 | 3.05 |
| Sebacic dihydrazide | 0.81 | 0.81 | 0.81 | 0.81 |
| Milled glass fiber[7] | 16.25 | — | 8.125 | 8.125 |
| Milled carbon fiber[8] | — | 16.25 | 8.125 | 8.125 |
| Calcium oxide | 2.44 | 2.44 | 2.44 | 2.44 |
| VANSIL W-10[9] | 11.78 | 11.78 | 11.78 | 11.78 |
| EXPANCEL 051 DU[10] | 2.84 | 2.84 | 2.84 | — |
| EXPANCEL 091 DU[11] | 0.81 | 0.81 | 0.81 | — |

-continued

| Ingredient: | Example: | | | |
|---|---|---|---|---|
| | 1 | 2 | 3 | 4 |
| Carbon black | 0.08 | 0.08 | 0.08 | 0.08 |
| Catalyst[12] | 0.81 | 0.81 | 0.81 | 0.81 |

[1]Polyglycidyl ether of Bisphenol A, available from Shell Oil and Chemical Co.
[2]Diglycidyl ether polyester as a solution in EPON 828 available from PPG Industries, Inc.
[3]Adduct of Dimer Fatty acid and EPON 828 in a 1 to 5 mole ratio.
[4]Cashew oil-derived monoepoxide available from Cardolite Corporation.
[5]Thixotropic clay, available from NL Industries.
[6]Hydrophobic fumed silica, available from Cabot Corporation.
[7]Available as 739DD from Owens-Corning Fiberglas Corp.
[8]Available as PANEX MF33 from Zoltek Corp., Carbon and Graphite Div.
[9]Wollastonite clay available from R. T. Vanderbilt Co., Inc.
[10,11]Expandable microspheres, available from Nobel Industries.
[12]Adduct of dimethylaminopropyl amine and isophorone diisocyanate and Bisphenol A in an equivalent ratio of about 1:1:3.75.

BENTONE 27 was premixed with EPON 828 and heated to about 100° C. Under shear mixing, the epoxy ester, EPON-dimer adduct and the CARDOLITE NC-513 were added. With the exception of the dicyandiamide, sebacic dihydrazide, and catalysts, the other ingredients were then added in order under a high rate of shear. The mixture was cooled to less than 35° C. and the catalysts were added under a moderate amount of shear. The mixture was degassed under reduced pressure using gentle mixing.

The compositions of Examples 1 to 4 were evaluated for deflection, readthrough, and flexural strength as follows:

1) Deflection: A film of about 50 mils (1.27 mm) in thickness and 1 inch (2.54 cm) in width of the composition was applied to a flat, oiled 1×6 inch (2.54×15.24 cm) strip of metal. The strip was placed in an oven at 325° to 350° F. (163° to 177° C.) for 20 to 30 minutes. The strip was cooled to ambient temperature and placed on a flat surface. Then one end of the strip was pressed down and the distance that the other end lifted from the horizontal was measured.

2) Readthrough: A film of about 50 mils (1.27 mm) of the composition about 2 inches (5.08 cm) in length and 1 inch (2.54 cm) in width was applied to a 4×12 inch (10.16× 30.48 cm) strip of metal. The strip was placed in an oven at 325° to 350° F. (163° to 177° C.) for 20 to 30 minutes. The strip was cooled to ambient temperature and observed at eye level to assess the occurrence of wrinkling above the cured coating. The strip was further coated with glossy black paint if necessary to aid visibility of any wrinkling. A rating was assigned from 0 ("perfect") to 5 ("worst").

3) Flexural strength: A 1×6 inch (2.54×15.24 cm) strip was prepared as for the Deflection test above and then placed in a jig on an Instron machine so that the edges were supported on each end while a blunt wedge was positioned in the middle, nearly touching the metal. On activation, the wedge flexed the reinforced metal until failure of the coating. The maximum load needed to induce failure was recorded.

The results are reported in Table I below:

TABLE I

| Property: | Example: | | | |
|---|---|---|---|---|
| | 1 | 2 | 3 | 4 |
| Viscosity 0.5 rpm[1] | 762,808 | 1,113,542 | 1,066,358 | 902,787 |
| Viscosity 1.0 rpm | 472,626 | 747,080 | 676,304 | 582,722 |

TABLE I-continued

| Property: | Example: | | | |
|---|---|---|---|---|
| | 1 | 2 | 3 | 4 |
| Thixotropic ratio[2] | 1.61 | 1.5 | 1.58 | 1.55 |
| Deflection, inches (mm) | 0.098 (2.49) | 0.048 (1.22) | 0.20 (5.04) | 0.85 (21.59) |
| Flexural strength, pounds, (kg), room temperature | 13 (28.6) | 24 (52.8) | 15.5 (34.1) | 20.5 (45.1) |
| Flexural strength, 180° F. (82.8° C.) | 14.5 (31.9) | 22.5 (49.5) | 17.5 (38.5) | 23 (50.6) |
| Readthrough rating | 1–1.5 | 2–2.5 | 1 | 4.5 |
| Metal thickness, inches (mm) | 0.032 (0.81) | 0.032 (0.81) | 0.032 (0.81) | 0.032 (0.81) |
| Cured coating thickness, inches (mm) | 0.148 (3.76) | 0.148 (3.76) | 0.163 (4.14) | 0.053 (1.35) |

[1]Measured with a Brookfield cone and plate viscometer, expressed in centipoise.
[2]Ratio of viscosity at 0.5 rpm to viscosity at 1.0 rpm.

The data in Table I indicates that deflection and readthrough are very poor when expandable microspheres are not used in the composition.

The following examples (5 to 8) show the benefits of the optional milled fibers for strength, surface integrity, and sag resistance during cure. The composition of Example 5 does not contain milled fibers, which were substituted with clay filler. In addition to the improvements for the material of Example 5 as noted in Table II, sag resistance may be improved by proportionally increasing amounts of the components in the composition in the absence of the milled fibers rather than increasing the amount of the filler. Improved Examples 6, 7, and 8 are comparative examples, wherein none of the compositions contain expandable microspheres. The composition of Example 6 contains milled glass fibers, the composition of Example 7 contains a mixture of glass and carbon fibers, and the composition of Example 8 contains glass fibers as well as a conventional blowing agent.

Reinforcing compositions were prepared as in Examples 1 to 4 from the following ingredients:

| Ingredient: | Example: | | | |
|---|---|---|---|---|
| | 5 | 6 | 7 | 8 |
| EPON 828 | 39.4 | 39.4 | 39.4 | 39.4 |
| Epoxy ester | 8.12 | 8.12 | 8.12 | 8.12 |
| EPON Dimer acid | 4.06 | 4.06 | 4.06 | 4.06 |
| CARDOLITE NC-513 | 4.06 | 4.06 | 4.06 | 4.06 |
| BENTONE 27 | 4.87 | 4.87 | 4.87 | 4.87 |
| CABOSIL TS-720 | 0.61 | 0.61 | 0.61 | 0.61 |
| Dicyandiamide | 3.05 | 3.05 | 3.05 | 3.05 |
| Sebacic dihydrazide | 0.81 | 0.81 | 0.81 | 0.81 |
| Milled glass fiber | — | 16.25 | 8.2 | 16.25 |
| Milled carbon fiber | — | — | 8.2 | — |
| Calcium oxide | 2.44 | 2.44 | 2.44 | 2.44 |
| VANSIL W-10 | 28 | 11.78 | 11.78 | 11.78 |
| EXPANCEL 051 DU | 2.84 | — | — | — |
| EXPANCEL 091 DU | 0.81 | — | — | — |
| Carbon black | 0.08 | 0.08 | 0.08 | 0.08 |
| Catalyst[1] | 0.81 | 0.81 | 0.81 | 0.81 |
| CELLOGEN 754[2] | — | — | — | 1.0 |

[1]Adduct of dimethylaminopropyl amine and isophorone diisocyanate and Bisphenol A, as described in Examples 1–4.
[2]Azide blowing agent available from Uniroyal Chemical Co., Inc.

Results of testing are reported in Table II below:

TABLE II

| Property: | Example: | | | |
|---|---|---|---|---|
| | 5 | 6 | 7 | 8 |
| Deflection, inches (mm) | 0.112 (2.84) | 0.222 (5.68) | 0.111 (2.84) | 0.069 (1.75) |
| Cured coating thickness, inches (mm) | 0.091 (2.31) | 0.048 (1.22) | 0.046 (1.17) | 0.079 (2.01) |
| Flexural strength, pounds (kg), room temperature | 10.5 (23.1) | 21.7 (47.7) | 22 (48.4) | 16 (35.2) |
| Cured coating thickness, inches (mm) | 0.100 (2.54) | 0.045 (1.14) | 0.051 (1.30) | 0.083 (2.11) |
| Flexural strength, 180° F. (82.8° C.) | 13.5 (29.7) | 19.3 (42.5) | 19.2 (42.5) | 14.7 (32.3) |
| Surface appearance | cracks, holes | smooth | smooth | bubbles, holes |
| Readthrough rating | 1–1.5 | 2–2.5 | 1 | 4.5 |
| Sag resistance[1] | delamination | good | good | sag |

[1]The uncured coating is applied to a metal panel which is placed in an oven at a 45° angle with the coating facing the oven floor. Sagging or displacement or any delamination is noted.

The data in Table II indicate that flexural strength can be improved by the addition of reinforcing fibers. Note that fibers cannot simply be replaced with fillers such as clay without loss of adhesion, perhaps even causing delamination. If a filler such as clay is added in place of fibers, the amount of thermosetting resinous composition such as epoxy should be proportionally increased. The data in Table II also indicate that readthrough is much better for compositions containing expandable microspheres than for those containing conventional blowing agents.

Examples 9 to 11 illustrate the advantages of using compositions in accordance with the process of the present invention compared to a composition containing no milled fibers or expandable microspheres. Example 9 is a control wherein the composition contains neither expandable microspheres nor fibers. The composition in Example 10 contains both expandable microspheres and fibers, while the composition in Example 11 contains expandable microspheres.

Reinforcing compositions were prepared as in Examples 1 to 4 from the following ingredients:

| Ingredient: | Example: | | |
|---|---|---|---|
| | 9 | 10 | 11 |
| EPON 828 | 48.5 | 48.5 | 48.5 |
| Epoxy ester | 10.0 | 10.0 | 10.0 |
| EPON Dimer acid | 5.0 | 5.0 | 5.0 |
| CARDOLITE NC-513 | 5.0 | 5.0 | 5.0 |
| Dicyandiamide | 3.75 | 3.75 | 3.75 |
| Sebacic dihydrazide | 1.00 | 1.00 | 1.00 |
| Milled glass fiber | — | 20.0 | — |
| EXPANCEL 051 DU | — | 4.5 | 4.5 |
| Calcium oxide | 3.0 | 3.0 | 3.0 |
| BENTONE 27 | 5.5 | 5.5 | 5.5 |
| VANSIL W-10 | 14.5 | 14.5 | 14.5 |

Results of testing are reported in Table III below:

TABLE III

|  | Example: | | |
|---|---|---|---|
| Property: | 9 | 10 | 11 |
| Deflection, inches (mm) | 0.584 (14.8) | 0.210 (5.33) | 0.330 (8.38) |
| Flexural strength, lb. (kg) 180° F. (82.8° C.) | 35.5 (16.1) | 40.8 (18.5) | 40.5 (18.4) |
| Cured coating thickness, inches (mm) | 0.111 (2.82) | 0.348 (8.84) | 0.389 (9.88) |
| Readthrough rating | 3.5–4 | <0.5 | 0.5 |

The data in Table III indicate that that readthrough is much better for compositions containing expandable microspheres with or without reinforcing fibers and deflection is improved for compositions containing expandable microspheres and even more so by the addition of reinforcing fibers.

We claim:

1. A method for reinforcing a thin rigid plate comprising: spraying a curable composition onto one side of the rigid plate followed by curing said composition while only in contact with said rigid plate; wherein the curable composition comprises:

(i) a thermosetting resinous composition; and
   (ii) thermoplastic polymeric expandable microspheres.

2. The method of claim 1 wherein the curable composition further comprises a particulate reinforcing material selected from the group consisting of milled glass fibers, milled carbon fibers, and mixtures thereof.

3. The method of claim 1 wherein the thermosetting resinous composition comprises an epoxy-based material containing at least two epoxide groups per molecule and a catalyst to initiate cure of the epoxy-based material.

4. The method of claim 3 wherein the thermosetting resinous composition further comprises a monoepoxide.

5. The method of claim 3 wherein the epoxy-based material comprises a polyglycidyl ether of Bisphenol A.

6. The method of claim 3 wherein the epoxy-based material comprises a mixture of two or more epoxy-based materials selected from the group consisting of epoxy-terminated dimer acids and epoxy-terminated polyesters.

7. The method of claim 3 wherein the catalyst is selected from the group consisting of dicyandiamide and dihydrazides of dibasic acids.

8. The method of claim 3 wherein the epoxy-based material is present in an amount ranging from 40 to 80 percent by weight based upon total weight of the composition.

9. The method of claim 3 wherein the catalyst is present in an amount ranging from 0.5 to 5 percent by weight based upon total weight of the composition.

10. The method of claim 3 wherein the expandable microspheres comprise thermoplastic polymeric shells containing a volatile liquid propellant.

11. The method of claim 3 wherein the expandable microspheres are present in an amount ranging from 2 to 5 percent by weight based upon total weight of the composition.

12. The method of claim 2 wherein the particulate reinforcing material is about 1/16 inch (1.59 mm) in length.

13. The method of claim 2 wherein the particulate reinforcing material is present in an amount ranging from 8 to 40 percent by weight based upon total weight of the composition.

14. The method of claim 1 wherein the thin rigid plate is selected from the group consisting of steel plates, aluminum plates, copper plates, stainless steel plates, and plastic plates.

15. The method of claim 1 wherein the composition, before curing, has a thickness of about 1 to 6 mm.

16. The method of claim 1 wherein the composition further comprises a crosslinking agent.

17. The method of claim 16 wherein the crosslinking agent is present in an amount ranging from 0.5 to 5 percent by weight based upon total weight of the composition.

18. A method for reinforcing a thin rigid plate comprising spraying a curable composition onto one side of the rigid plate followed by curing said composition while only in contact with said rigid plate; wherein the curable composition comprises:

(i) a thermosetting resinous composition present in an amount ranging from 40 to 80 percent by weight based upon total weight of the composition;
   (ii) thermoplastic polymeric expandable microspheres present in an amount ranging from 1 to 7 percent by weight based upon total weight of the composition; and
   (iii) a particulate reinforcing material selected from the group consisting of milled glass fibers, milled carbon fibers, and mixtures thereof present in an amount ranging from 8 to 40 percent by weight based upon total weight of the composition.

* * * * *